Aug. 25, 1959 J. H. BACON 2,900,696
DOG COLLAR OR THE LIKE
Filed Feb. 27, 1956 2 Sheets-Sheet 1

INVENTOR.
John H. Bacon
BY Ezekiel Wolf
his attorney.

Aug. 25, 1959   J. H. BACON   2,900,696
DOG COLLAR OR THE LIKE
Filed Feb. 27, 1956   2 Sheets-Sheet 2

INVENTOR.
John H. Bacon
BY Ezekiel Wolf
his Attorney.

United States Patent Office 2,900,696
Patented Aug. 25, 1959

2,900,696

DOG COLLAR OR THE LIKE

John H. Bacon, Wellesley Hills, Mass.

Application February 27, 1956, Serial No. 568,026

2 Claims. (Cl. 24—206)

The present invention relates to an improved construction for a collar or belt-like member particularly adapted for use as dog collars or the like.

The present invention provides a unitary structure formed of plastic material in which the main portion of a collar is formed integrally and simultaneously with the fastening portions of the device.

This structure which is made preferably of a flexible plastic material may be injection molded to form the unit in a single step. Thus, in the present invention there is provided at one end of the main or belt portion of the device a male end adapted to interlockingly project into a female section integrally formed at the other end. This injection molding operation may be accomplished with a minimum requirement of undercutting or side action in the injection molding die.

Further, the present invention provides a structure which is quite inexpensive, particularly as it requires no hand labor in the forming process.

The present invention also provides means by which the collar unit may be adjusted to various desired lengths. In one modification of this invention, successive projections are provided at the male section end, which projections may be successively severed from the end to provide shorter collar units.

In another modification of this invention, the male section is adapted to project through the female section and is further adapted to be engagingly held or fixed in any selected position of tightness over a wide range.

Figure 1:
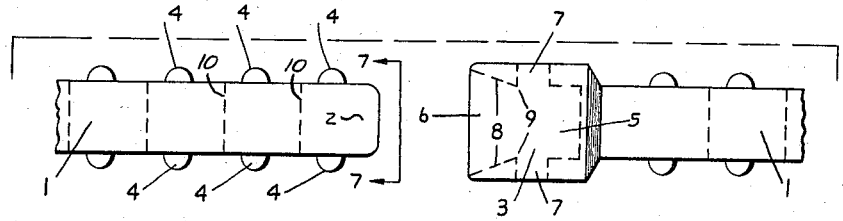
Figure 2:
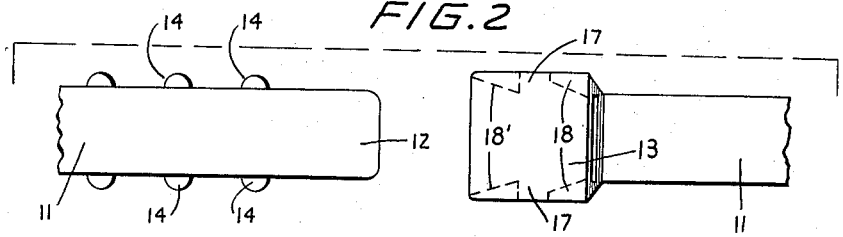
Figure 3:
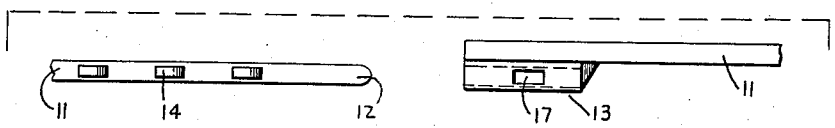
Figure 4:
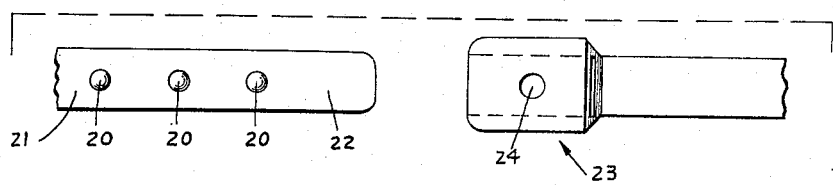
Figure 5:
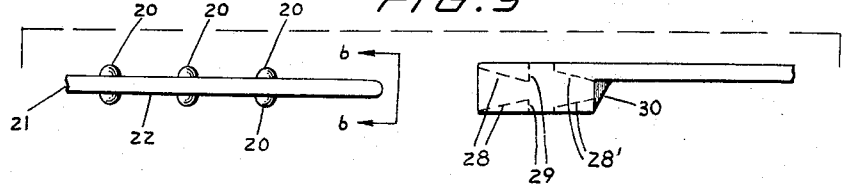
Figure 6:
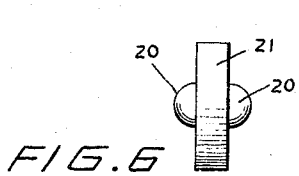
Figure 7:
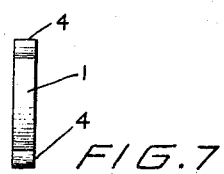
Figure 8:
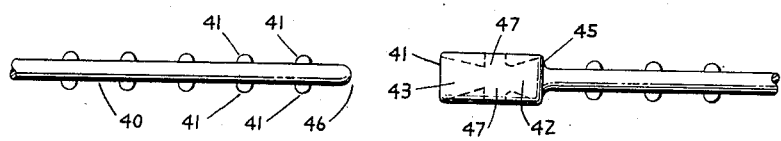
Figure 9:
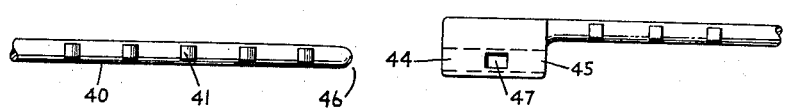
Figure 10:
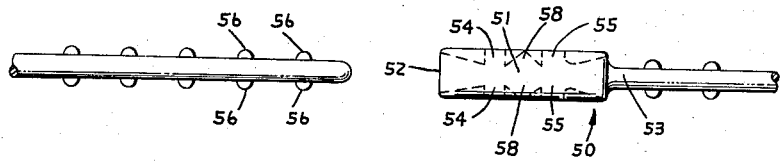
Figure 11:
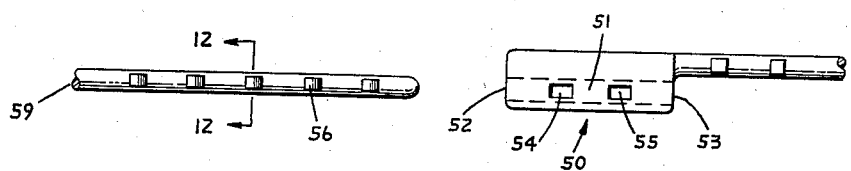
Figure 12:
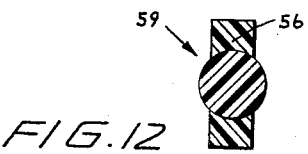
Figure 14:
Figure 13:
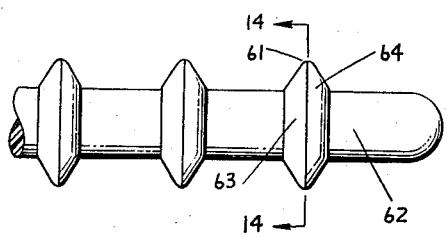

These and other objects of the present invention will be more clearly understood when considered in connection with the accompanying drawings in which:

Figure 1 is a front fragmentary plan view of the engaging ends of the invention, Figure 2 is a front fragmentary plan view of the engaging ends of a modification of the invention, Figure 3 is a top fragmentary plan view of the portions shown in Figure 2, Figure 4 is a front fragmentary plan view of a further modification of the invention, Figure 5 is a top fragmentary plan view of the modification shown in Figure 4, Figure 6 is a view taken along the line 6—6 of Figure 5, Figure 7 is a view taken along the line 7—7 of Figure 1, Figure 8 is a front fragmentary plan view of a further modification of the invention, Figure 9 is a top fragmentary plan view of the modification shown in Figure 8, Figure 10 is a front fragmentary plan view of a further modification of the invention, Figure 11 is a top fragmentary plan view of the modification shown in Figure 10, Figure 12 is a cross-section taken substantially along the line 12—12 of Figure 11, Figure 13 is a front fragmentary plan view of a further modification of the invention, and Figure 14 is a cross-section taken substantially along the line 14—14 of Figure 13.

Referring particularly to the figures, there is shown several modifications of the present invention in which the collar form is particularly useful for such purposes as pet collars, shoe lace applications, or the like, and in which the collar is formed in a unitary structure preferably of a plastic material having flexible qualities, such as polyethylene.

In the drawings, the collar is illustrated in two sections, a male section and a female section. However, it should be understood that the broken ends of each of these sections are continuous with one another, thus forming an elongated body section having at its ends a male section and a female section adapted to interengage. For convenience, the engaging ends are illustrated only.

Referring specifically to Figure 1, I have illustrated a collar in which the body member 1 has at one end a male section 2 and at the other end a female section 3. The body 1 is formed of an elongated, flat, substantially rectangular, cross-sectioned length of material. Extending along the side edges of this body 1 are a series of oppositely arranged knobs or projections 4. Each is preferably positioned at uniform distances from one another. The female section 3 is formed of an enlarged section at the end of the body 1 and has a recess formed therein of sufficient thickness to receive the width of the male end 2. This recess 5 is flared at its open end 6 to receive and guide the male section 2 inwardly into the recess 5. Provided as a portion of this recess 5 are oppositely arranged openings 7 extending outwardly to the upper and lower edges or sides of the female section. These recesses or openings 7 form in cooperation with the walls 8 transverse, engaging edges 9. Thus, as the male section 2 is injected into the recess 5, the leading pair of projections 4 will force themselves against the walls 8 until the male section 2 has been pushed into the recess sufficiently far enough so that these projections 4 pass beyond the wall 8. Because of the resilient construction of this unit, the wall 8 will distend and permit the passage of the knobs or projections 4 to a position at the recesses 7. When the leading pair of projections 4 are aligned with the recesses or holes 7, they will be securely engaged in this position by the engaging edges 9. At this position, because of the angle of the side walls forming these edges 9, only a determined pull will permit the removal of the male section from the female section.

It should be noted that the width of this opening 5 may be beveled from its mouth to the bottom so as to more readily permit insertion of the male section. The male section, however, should be of such thickness as to substantially occupy the recess 5 when inserted into a locking position. When in this locking position, the male projections should snugly engage in the openings 7.

It will be noted that in this construction there are provided a series of score lines 10 transversely to the collar body and located between the projections 4. In this construction, should a shortening of the collar be desired, one need only sever the end-most projection 4 from the body member and thereby reduce the length of the belt. When this is done, the succeeding pair of projections 4 will act as the locking projections for engagement of the collar in a locked position.

In Figures 2 and 3, there is illustrated a modification of this invention in which the body member 11 is provided with a male section 12 and a female section 13. Projections 14 are arranged on the body member 11 in a manner similar to that previously described and for the purposes previously described. In this modification, however, it should be noted that the leading pair of projections 14 are spaced somewhat further back from the end of the male section than the previously described modification. In the female section 13 the recess adapted to receive the male section 12 is shown in dotted outline. In this modification, it will be noted the recess is open at either end a sufficient distance so that the entire male probe may project through it whereby successive projections 14 may be aligned with the holes 17. By this expedient, the belt or collar may be tightened to any desired diameter without the requirement of cutting the end of the male section.

It should further be noted in this modification that the walls 18 are inclined to substantially the same angle as walls 18'; thus, providing a substantial double locking structure when at least one pair of projections 14 have passed through the female section completely.

The modifications illustrated in Figures 4 and 5 are quite similar to those described in connection with Figures 2 and 3. In this structure, however, the projecting knobs are formed at 20 on the flat surface 22 of the body member 21. In this structure also, the female section 23 has an opening 24 formed in it corresponding to the projections 20. Thus, the opening 24 is formed in the face of the female section 23. As illustrated in Figure 5, the recess is provided with bevelled walls 28 and 28' substantially parallel with one another which cooperate with walls 29 and 30 to form a double set of locking edges for the projections 20 in a manner similar to that described above. In this structure, both sets of locking edges 29 and 30 will engage pairs of successive projections 20 when at least one pair of projections 20 are passed entirely through the female section.

In Figures 6 and 7, there is illustrated end views of the body sections 21 and 1 respectively.

In Figures 8 and 9 there is illustrated a modification in which the body member 40 is formed of a circular cross-sectioned length with the projecting knobs 41 formed at opposite ends of a diameter of the cross-section. The female section 42 is formed with an opening 43 passing entirely through it with open ends 44 and 45 adapted to permit the passage of the male section 46 entirely through the female section 42. Openings transverse to the main opening 42 in the female section are provided at 47 to receive the projecting knobs or projections 41 in a manner as previously described so as to permit adjustment of the collar to any desired length.

A structure similar to that described in connection with Figures 8 and 9 is shown in Figures 10 and 11. In this structure, however, the female section 50 is provided with a recess 51 open at both ends 52 and 53 and with a plurality of transverse openings arranged in pairs, 54 and 55. These transverse pairs of openings 54 and 55 serve to provide a bevel engaging means so that a double strength lock may be obtained by engagement of two pairs of projecting knobs or projections 56. It is to be noted in this construction there is also provided a depression 58 intermediate each opening 54 and 55 respectively. These depressed sections or recesses 58 provide an additional intermediate locking means so that a knob may, if desired, be engaged within the recess 58.

In Figure 12, there is shown a cross-section of the male section 59 of Figures 10 and 11. The projection 56 is illustrated in contrasting hatching for the purpose of indicating relative sizes. However, it should be understood that the projections 56 and the body section 59 are of unitary structure.

Similarly, in Figure 14, where there is illustrated a cross-section of the modification of Figure 13, the projection 61 is illustrated in contrasting hatching merely for illustrative purposes.

In Figures 13 and 14, this knob 61, which is integral with the body section or member 62, is concentric to the body section 62 and is formed as a ring bevelled on either surface at 64; thus, providing an engaging member entirely around the body of the collar. In this structure, the knobs thereby provide a greater engaging surface for a firmer engagement.

Having now described my invention, I claim:

1. A fastener of the class described comprising an elongated member rectangular in cross section and molded of polyethylene, a number of projecting bosses formed on the narrow opposite sides of the member and adjacent one end of the member, a sleeve formed on one of the other sides of the member and adjacent the other end, means forming an opening extending through the sleeve and parallel to the member for receiving the first named end of the member, a pair of oppositely disposed holes formed transversely through the sleeve and extending in the same direction as and adapted to receive the bosses, said opening being flared outwardly from the recesses to the end of the sleeve through which the first named end of the member is inserted and forming a shoulder which yieldably holds the bosses when they are inserted in the recesses.

2. A fastener of unitary structure formed of a flexible resilient material comprising an elongated member having a plurality of pairs of projecting bosses arranged one of each pair on opposite sides of said member with the pairs successively spaced at one end of said member, a sleeve integrally formed at the other end of said member having inner walls forming a longitudinal opening through said sleeve through which said one end is adapted to be drawn, said inner walls having an annular portion spaced from the ends of the wall of a shape and size substantially coincident with the shape and size of said one end with said walls flared outwardly from said annular portion to the ends of the wall, and means forming holes transversely through said sleeve terminating at their inner ends at opposite locations on said annular portion, said holes adapted to removably receive successively said bosses.

References Cited in the file of this patent

UNITED STATES PATENTS

| | | |
|---|---|---|
| 971,519 | Brannen | Oct. 4, 1910 |
| 1,378,946 | Gilson | May 24, 1921 |
| 1,974,499 | Luce | Sept. 25, 1934 |
| 2,007,517 | Boyd | July 9, 1935 |
| 2,361,506 | Smith | Oct. 31, 1944 |
| 2,495,667 | Vizner | Jan. 24, 1950 |
| 2,545,428 | Liautaud | Mar. 13, 1951 |
| 2,714,269 | Charles | Aug. 2, 1955 |
| 2,793,842 | Bacon | May 28, 1957 |
| 2,805,499 | Nutter | Sept. 10, 1957 |

FOREIGN PATENTS

| | | |
|---|---|---|
| 1,110,010 | France | Oct. 5, 1955 |